United States Patent
Walbeck et al.

[15] 3,685,450
[45] Aug. 22, 1972

[54] FLOATING GRENADE CUP

[72] Inventors: Calvin Walbeck, North East; John M. Jacoby, Edgewood; Carl E. Gepp, Bel Air; Louis A. Robertson, Edgewood, all of Md.

[73] Assignee: The United States of America as represented by the Secretary of the Army

[22] Filed: June 3, 1970

[21] Appl. No.: 43,048

[52] U.S. Cl. ................................. 102/65, 102/65.2
[51] Int. Cl. ............................................. F42b 13/44
[58] Field of Search ............................... 102/65, 65.2

[56] References Cited

UNITED STATES PATENTS 2,447,971   8/1948   Weinert .................. 102/65.2
3,427,973   2/1969   Beers ...................... 102/65

Primary Examiner—Verlin R. Pendegrass
Attorney—Edward J. Kelly, Harry M. Saragovitz, Herbert Berl and Bernard J. Ohlendorf

[57] ABSTRACT

An apparatus and method for dispensing a predetermined material over a body of water by floating a munition on the body of water.

5 Claims, 6 Drawing Figures

PATENTED AUG 22 1972  3,685,450
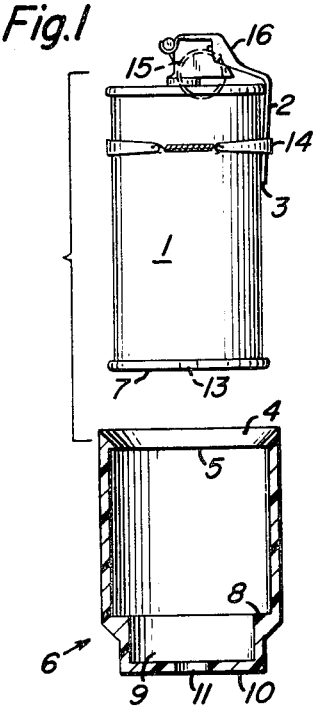
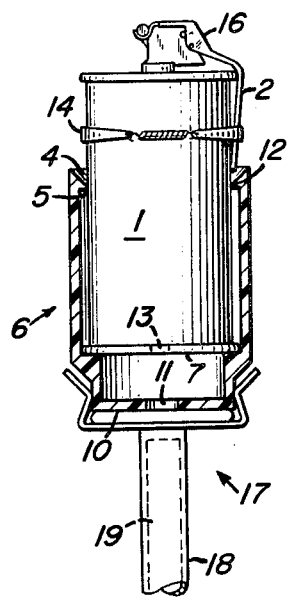
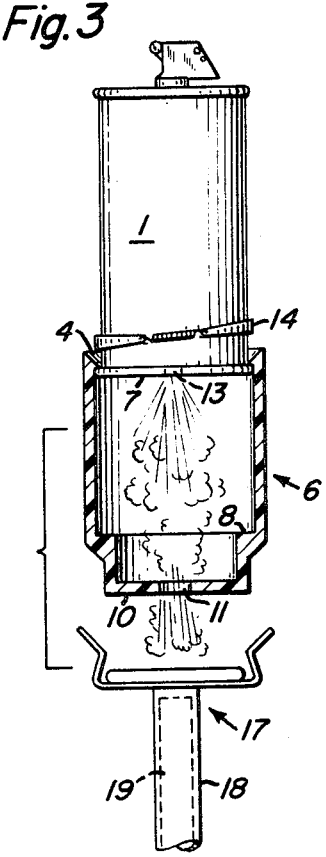
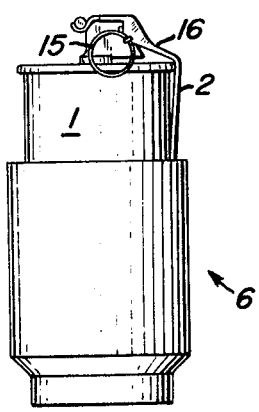
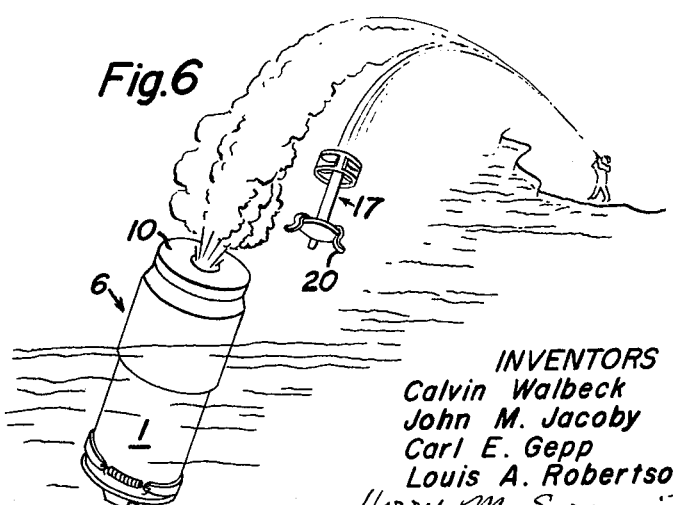
INVENTORS
Calvin Walbeck
John M. Jacoby
Carl E. Gepp
Louis A. Robertson
BY
Harry M. Saragovitz
Edward J. Kelly
Herbert Berl
Bernard J. Ohlendorf
ATTORNEYS

FLOATING GRENADE CUP

DEDICATORY CLAUSE

The invention described herein may be manufactured, used, and licensed by or for the Government for governmental purposes without the payment to us of any royalty thereon.

Our invention relates to a means and method for dispensing a predetermined material over a body of water by causing a munition to float on the body of water.

The prior art contains many munitions and means and methodology for dispensing the munitions such as hand grenades as disclosed in U.S. Pat. Ser. Nos. 1,311,006; 2,079,008; 2,094,562; 2,368,064; and 2,939,449; but none of the prior art provided a munition which could be effectively floated on a body of water during dissemination of the munition contents. Our invention was conceived and reduced to practice to overcome the aforementioned prior art problem and to satisfy the long felt need for a munition which could be floated on a body of water to disseminate a predetermined material.

Our invention has utility to float a grenade containing chemical contents to generate a smoke cloud, for example, on a body of water to disseminate the grenade contents, such as smoke generated from the grenade chemical contents, at a point on the body of water where the grenade floats to serve, for example, as a smoke screen or as a marker to mark the particular location on the body of water.

The principal object of our invention is to provide a reliable and effective means and method to float a munition on a body of water to dispense the munition contents, either per se or as the product of a chemical reaction, over the floating location.

Other objects of our invention will be obvious or will appear from the specification hereinafter set forth.

FIG. 1 is an exploded view showing a conventional grenade modified with a shortened firing lever and a retaining ring prior to insertion of the grenade in our float means improvement.

FIG. 2 is a sectional view of the grenade shown in FIG. 1 mounted within the float means shown in FIG. 1 and a firing adapter attached to the float means.

FIG. 3 is a view of the assembly shown in FIG. 2 after ejection from a propelling means.

FIG. 4 is a view of the retaining ring used to maintain the grenade firing lever in the safe position prior to firing the grenade from a propelling means.

FIG. 5 is a pictorial view of the grenade shown in FIG. 1 mounted within the float means shown in FIG. 1.

FIG. 6 is a view showing the utility of our invention.

Our invention as shown in FIGS. 1 to 6 will now be described in detail as follows.

A conventional munition 1, such as the hand grenades described in the aforementioned prior art, has the firing lever 2 shortened to a predetermined length so that end 3 of the firing lever will be located between annular bevel wall 4 and the outer wall of the munition and slightly above surface interface 5 of the float means shown at 6 when the munition is fully inserted within the float means; as shown in FIG. 2. When the munition is fully inserted within the float means, bottom 7 of the munition rests on annular flange 8 of the float means to leave a space 9 between bottom 7 of the grenade and bottom 10 of the float means. Hole means 11 is provided in bottom 10 to permit escape of grenade contents or the product of contents chemical reaction and gas and heat evolving from the detonation of a conventional explosive charge, such as described in Col. 2, lines 64 to 68 of aforementioned U.S. Patent Ser. No. 2,079,008, used to disseminate the grenade contents, such as conventional gas generating chemicals as described in U.S. Patent Ser. No. 2,079,008; build up within space 9 and escape from hole 11 of the gas and heat evolved from the grenade contents and the explosive charge detonation generates sufficient pressure to prevent water from entering space 9 and enables the grenade combination of our invention to float until the contents of the grenade have been expelled. The aforementioned evolved gas, heat, and grenade content escapes into space 9 from hole 13 in the grenade bottom. Grenade 1 is friction fit within float 6, which can be any rigid floatable material, such as plastic, and grenade 1 is prevented from disengaging from float 6 after insertion within the float by annular shoulder 12 of the float acting as a stop means for annular flanged bottom 7 of the grenade. Our grenade combination can be launched either by hand throwing in the conventional manner, now shown in the drawing, or by firing from any conventional propulsion device, such as a rifle. When thrown by hand, retention ring 14 is not necessary as a safety means to maintain the grenade in a non-discharge state to prevent premature grenade activation but a conventional pull ring 15 attached to a conventional safety pin can be utilized to pull the safety pin to activate a conventional firing mechanism 16 in the conventional manner when one desires to discharge the grenade; the safety means preventing operation of the firing lever 2 prematurely. If fired from a propulsion device, as shown in FIG. 6, a conventional adapter means, shown at 17, such as disclosed in the aforementioned prior art, is friction fit on the bottom of float 6 and hollow tube 18, integral with the adapter, is inserted on barrel tube 19 of the propulsion device, as shown in FIG. 2; the propulsion device not being a part of our invention and not being shown in the drawing. When fired from a propulsion device, flexible steel band retaining ring 14 having a spring connecting the band ends holds firing lever 2 in the safe position until grenade 1 is launched from the propulsion device, as shown in FIG. 1, and set back force on grenade 1 upon discharge of the propulsion device forces retention ring 14 toward the bottom 7 of the grenade to release firing lever 2 and activate conventional firing mechanism 16. While in flight, the grenade contents are discharged from the grenade which has been separated from adapter 17, shown in FIG. 6, by the spreading of spring clips 20 as a result of set back force action on the spring clips and, upon termination of the flight of our grenade combination, it floats as above described and as shown in FIG. 6 when it lands in a body of water. While a cylindrical configuration is our preferred embodiment, any configuration and dimensions can be utilized for our invention to suit any given application within the skill of the art.

It is obvious that other modifications can be made of our invention, and we desire to be limited only by the scope of the appended claims.

We claim:

1. A munition comprising a grenade, a firing mechanism integral with the grenade to activate the grenade, a removable safety means within the firing mechanism to prevent premature activation of a firing lever, and a firing lever integral with the firing mechanism to prevent premature activation of the firing mechanism wherein the improvement in combination therewith is a float means fixedly attached to and surrounding the grenade, said float means being a rigid cup comprising a hole centrally located in the closed end, said hole being adapted to release any predetermined material from the grenade; an annular flange integral with the inside wall of the cup and extending a predetermined distance from the closed end of the cup, said flange being adapted to act as a stop means for the grenade when inserted within the float means; a beveled annular wall extending a predetermined distance from the open end of the cup, said beveled wall being sloped toward the center of the cup and adapted to form an annular shoulder stop means; and an annular shoulder means integral with the cup inside wall and projecting toward the center of the cup to form an interface at the base of the beveled wall, said shoulder means being adapted to act as a stop means to prevent disengagement of the grenade from the float means.

2. The munition of claim 1 wherein the cup means has a first outside diameter portion joined to a larger second outside diameter portion by a beveled surface, the beveled surface being sloped downward toward the center of the cup from the second outside diameter to the first outside diameter; the first outside diameter portion and the beveled surface being adapted to be friction fit attached to an adapter means for propulsion launching.

3. The munition of claim 1 wherein the cup is plastic.

4. The munition of claim 1 wherein the firing lever is a predetermined length selected to locate the end of the lever opposite to the firing mechanism at a point adjacent to and above the interface and between the grenade outer wall and the beveled wall.

5. The munition of claim 1 wherein the safety means is a flexible steel band having the ends joined by a spring means; said band being adapted to surround the grenade, to maintain the firing lever in an inoperative position prior to launching the grenade to prevent premature grenade discharge, and to be removed to release the firing lever by a set back force generated upon discharge of a propulsion means; the grenade being removably attached to the barrel of the propulsion means by an adapter means.

* * * * *